United States Patent
Bhalerao et al.

(10) Patent No.: US 9,124,534 B1
(45) Date of Patent: Sep. 1, 2015

(54) SYSTEMS AND METHODS FOR MANAGING SUB-CLUSTERS WITHIN DEPENDENT CLUSTERED COMPUTING SYSTEMS SUBSEQUENT TO PARTITION EVENTS

(71) Applicant: Symantec Corporation, Mountain View, CA (US)

(72) Inventors: Anand Bhalerao, Maharashtra (IN); Amol Katkar, Bopodi (IN); Jai Gahlot, Churu (IN)

(73) Assignee: Symantec Corporation, Mountain View, CA (US)

( * ) Notice: Subject to any disclaimer, the term of this patent is extended or adjusted under 35 U.S.C. 154(b) by 248 days.

(21) Appl. No.: 13/779,588

(22) Filed: Feb. 27, 2013

(51) Int. Cl.
*G06F 15/16* (2006.01)
*H04L 12/911* (2013.01)

(52) U.S. Cl.
CPC ..................... *H04L 47/70* (2013.01)

(58) Field of Classification Search
CPC . G06F 9/45558; G06F 9/5061; G06F 9/5077; G06F 11/1484; G06F 2009/4557; G06F 3/0665; H04L 47/70
See application file for complete search history.

(56) References Cited

U.S. PATENT DOCUMENTS

| | | | | |
|---|---|---|---|---|
| 8,024,432 B1* | 9/2011 | Sharma et al. | | 709/220 |
| 8,060,773 B1* | 11/2011 | Katkar et al. | | 714/4.1 |
| 8,495,323 B1* | 7/2013 | Tatavarty | | 711/164 |
| 2005/0283641 A1* | 12/2005 | Clark et al. | | 714/4 |
| 2013/0227558 A1* | 8/2013 | Du et al. | | 718/1 |

* cited by examiner

*Primary Examiner* — Melvin H Pollack
(74) *Attorney, Agent, or Firm* — ALG Intellectual Property, LLC

(57) ABSTRACT

A computer-implemented method for managing sub-clusters within dependent clustered computing systems subsequent to partition events may include (1) identifying a first computing cluster and a second computing cluster, (2) determining that the first computing cluster depends on the second computing cluster, (3) detecting a partition event that partitions the first computing cluster into multiple sub-clusters, (4) determining, in response to detecting the partition event, whether the second computing cluster is partitioned into multiple sub-clusters, and (5) making, based at least in part on determining whether the second computing cluster is partitioned into multiple sub-clusters, a fencing decision for the multiple sub-clusters of the first computing cluster. Various other methods, systems, and computer-readable media are also disclosed.

20 Claims, 8 Drawing Sheets

SYSTEMS AND METHODS FOR MANAGING SUB-CLUSTERS WITHIN DEPENDENT CLUSTERED COMPUTING SYSTEMS SUBSEQUENT TO PARTITION EVENTS

BACKGROUND

Computing clusters may provide various advantages over non-clustered computing systems. For example, clusters may provide services with high availability, enable load balancing for large computational workloads, and/or provide more computational power with less powerful constituent nodes.

A computing cluster may include one or more resources that are shared between nodes within the cluster, such as one or more storage devices. Thus, multiple nodes within the cluster may access the same data. By working in concert, the nodes of a cluster may safely access and alter data for clustered applications. The nodes of a cluster may also work in concert to reconfigure the cluster itself. For example, if a node in a cluster fails, other nodes in the cluster may attempt to take on the responsibilities of the failed node.

However, under some conditions two or more sub-clusters of a cluster may become partitioned yet still have access to shared cluster resources. In this case, each sub-cluster of the cluster may attempt to take over the responsibilities for the entire cluster without coordinating with other sub-clusters of the cluster. This may lead to undesirable results such as corrupted shared cluster resources. In order to handle such "split-brain" scenarios, a conventional computing cluster may be configured to make a fencing decision that (1) selects one of the sub-clusters to take over the responsibilities for the entire cluster and (2) isolates the other sub-clusters from shared cluster resources.

Unfortunately, some clustered computing systems may include multiple clusters and, in some cases, may include clusters that depend on other clusters to operate (e.g., a cluster of virtual machines may depend on the cluster of hypervisors on which it runs). If each cluster within these clustered computing systems performs independent fencing decisions, the independent fencing decisions may be incompatible (e.g., incompatible fencing decisions may result in the complete loss of high-availability for applications running inside dependent clusters). Accordingly, the instant disclosure identifies a need for efficiently and effectively managing sub-clusters within dependent clustered computing systems subsequent to partition events.

SUMMARY

As will be described in greater detail below, the instant disclosure generally relates to systems and methods for managing sub-clusters within dependent clustered computing systems subsequent to partition events. In one example, a computer-implemented method for managing sub-clusters within dependent clustered computing systems subsequent to partition events may include (1) identifying a first computing cluster and a second computing cluster, (2) determining that the first computing cluster depends on the second computing cluster, (3) detecting a partition event that partitions the first computing cluster into multiple sub-clusters, (4) determining, in response to detecting the partition event, whether the second computing cluster is partitioned into multiple sub-clusters, and (5) making, based at least in part on determining whether the second computing cluster is partitioned into multiple sub-clusters, a fencing decision for the multiple sub-clusters of the first computing cluster.

In some examples, the step of making the fencing decision for the multiple sub-clusters of the first computing cluster may include receiving, at a node of the second computing cluster and from a node of a sub-cluster of the first computing cluster, a request for the fencing decision for the multiple sub-clusters of the first computing cluster.

In some examples, the step of making the fencing decision for the multiple sub-clusters of the first computing cluster may further include making, at the node of the second computing cluster and based at least in part on determining that the second computing cluster is not partitioned into multiple sub-clusters, the fencing decision for the multiple sub-clusters of the first computing cluster.

In certain examples, the step of making the fencing decision for the multiple sub-clusters of the first computing cluster may further include (1) sending, from the node of the second computing cluster and in response to determining that the second computing cluster is partitioned into multiple sub-clusters, a request to a central coordination point for a fencing decision for the multiple sub-clusters of the second computing cluster, (2) receiving, at the node of the second computing cluster, the fencing decision for the multiple sub-clusters of the second computing cluster, and (3) making, at the node of the second computing cluster and based at least in part on the fencing decision for the multiple sub-clusters of the second computing cluster, the fencing decision for the multiple sub-clusters of the first computing cluster.

In some examples, the step of making the fencing decision for the multiple sub-clusters of the first computing cluster may further include (1) relaying, at the node of the second computing cluster and to a central coordination point, the request for the fencing decision for the multiple sub-clusters of the first computing cluster, and (2) making, at the central coordination point, the fencing decision for the multiple sub-clusters of the first computing cluster.

In some examples, the request for the fencing decision for the multiple sub-clusters of the first computing cluster may be relayed to the central coordination point after waiting for a predetermined amount of time.

In certain examples, the step of making the fencing decision for the multiple sub-clusters of the first computing cluster may further include (1) sending, at the node of the second computing cluster and in response to determining that the second computing cluster is partitioned into multiple sub-clusters, a combined request to a central coordination point for the fencing decision for the multiple sub-clusters of the first computing cluster and a fencing decision for the multiple sub-clusters of the second computing cluster, and (2) making, at the central coordination point and in response to the combined request from the node of the second computing cluster, the fencing decision for the multiple sub-clusters of the first computing cluster.

In some examples, the node of the second computing cluster may include a hypervisor, the node of the sub-cluster of the first computing cluster may include a virtual machine running on the hypervisor, and the request for the fencing decision for the multiple sub-clusters of the first computing cluster may be received over a direct communication channel between the hypervisor and the virtual machine.

In some examples, the first computing cluster may include a cluster of virtual machines, the second computing cluster may include a cluster of hypervisors, and the step of determining that the first computing cluster depends on the second computing cluster may include determining that the cluster of virtual machines runs on the cluster of hypervisors.

In at least one example, the step of determining that the cluster of virtual machines runs on the cluster of hypervisors may include tracking the node of the cluster of hypervisors on which each node within the cluster of virtual machine runs.

In one embodiment, a system for implementing the above-described method may include (1) an identifying module programmed to identify a first computing cluster and a second computing cluster, (2) a dependency-determining module programmed to determine that the first computing cluster depends on the second computing cluster, (3) a partition-detecting module programmed to detect a partition event that partitions the first computing cluster into multiple sub-clusters and determine, in response to detecting the partition event, whether the second computing cluster is partitioned into multiple sub-clusters, (4) a fencing module programmed to make, based at least in part on determining whether the second computing cluster is partitioned into multiple sub-clusters, a fencing decision for the multiple sub-clusters of the first computing cluster, and (5) at least one processor configured to execute the identifying module, the dependency-determining module, the partition-detecting module, and the fencing module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a first computing cluster and a second computing cluster, (2) determine that the first computing cluster depends on the second computing cluster, (3) detect a partition event that partitions the first computing cluster into multiple sub-clusters, (4) determine, in response to detecting the partition event, whether the second computing cluster is partitioned into multiple sub-clusters, and (5) make, based at least in part on determining whether the second computing cluster is partitioned into multiple sub-clusters, a fencing decision for the multiple sub-clusters of the first computing cluster.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
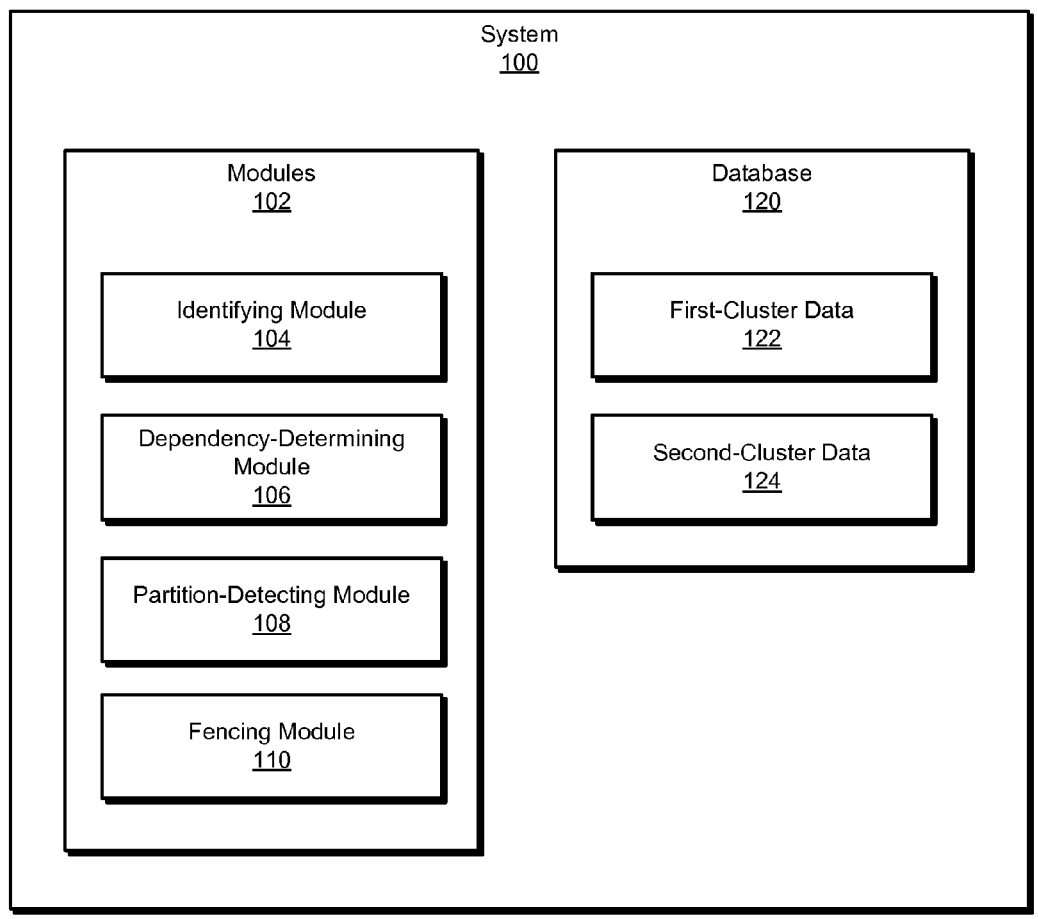
FIG. 1 is a block diagram of an exemplary system for managing sub-clusters within dependent clustered computing systems subsequent to partition events.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for managing sub-clusters within dependent clustered computing systems subsequent to partition events. As will be explained in greater detail below, by identifying when a first computing cluster depends on a second computing cluster, the systems and methods described herein may coordinate fencing decisions for the first and second computing clusters. Furthermore, in some examples, by identifying when an in-guest cluster is running on an on-host cluster, these systems and methods may coordinate fencing decisions for the in-guest and on-host clusters. Moreover, by coordinating fencing decisions for in-guest and on-host clusters, these systems and methods may improve application availability within the in-guest and on-host clusters while also preserving data integrity. Embodiments of the instant disclosure may also provide various other advantages and features, as discussed in greater detail below.

Figure 2:
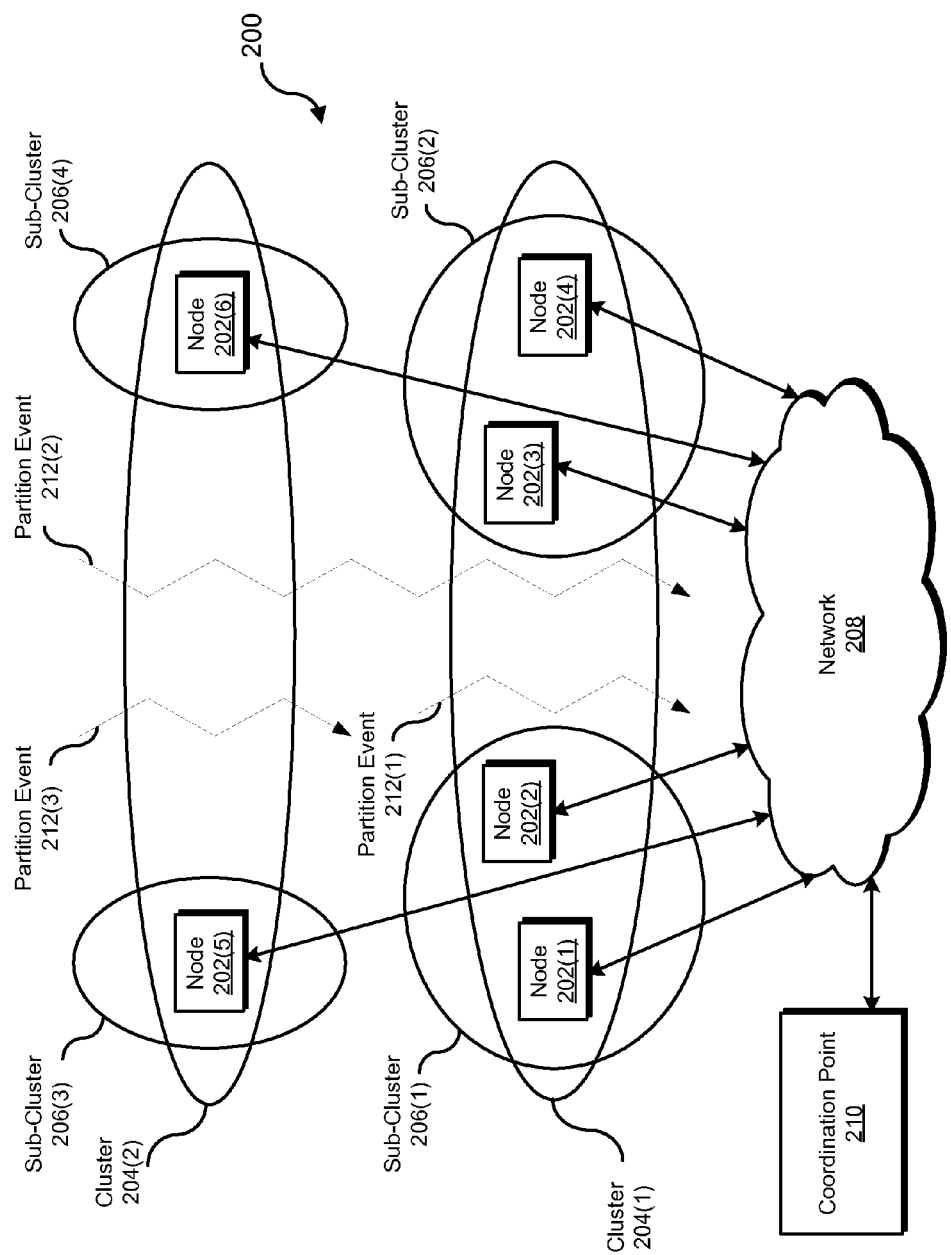
FIG. 2 is a block diagram of an exemplary system for managing sub-clusters within dependent clustered computing systems subsequent to partition events.

The following will provide, with reference to FIGS. 1-2, detailed descriptions of exemplary systems for managing sub-clusters within dependent clustered computing systems subsequent to partition events. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for managing sub-clusters within dependent clustered computing systems subsequent to partition events. As illustrated in this figure, exemplary system 100 may include one or more modules 102 for performing one or more tasks. For example, and as will be explained in greater detail below, exemplary system 100 may include an identifying module 104 programmed to identify a first computing cluster and a second computing cluster. Exemplary system 100 may also include a dependency-determining module 106 programmed to determine that the first computing cluster depends on the second computing cluster.

In addition, and as will be described in greater detail below, exemplary system 100 may include a partition-detecting module 108 programmed to detect a partition event that partitions the first computing cluster into multiple sub-clusters and determine, in response to detecting the partition event, whether the second computing cluster is partitioned into multiple sub-clusters. Exemplary system 100 may also include a fencing module 110 programmed to make, based at least in part on determining whether the second computing cluster is partitioned into multiple sub-clusters, a fencing decision for the multiple sub-clusters of the first computing cluster. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., nodes 202(1)-(6) and/or coordination point 210), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include first-cluster data 122 for storing information about the first computing cluster and second-cluster data 124 for storing information about the second computing cluster.

Database 120 may represent portions of a single database or computing device or a plurality of databases or computing devices. For example, database 120 may represent a portion of nodes 202(1)-(6) and/or coordination point 210 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as nodes 202(1)-(6) and/or coordination point 210 in FIG. 2, computing system 710 in FIG. 7, and/or portions of exemplary network architecture 800 in FIG. 8.

Exemplary system 100 in FIG. 1 may be implemented in a variety of ways. For example, all or a portion of exemplary system 100 may represent portions of exemplary system 200 in FIG. 2. As shown in FIG. 2, system 200 may include nodes 202(1)-(6) and coordination point 210 in communication via a network 208. Nodes 202(1)-(6) may be programmed with one or more of modules 102 and/or may store all or a portion of the data in database 120. Additionally or alternatively, coordination point 210 may be programmed with one or more of modules 102 and/or may store all or a portion of the data in database 120.

In one embodiment, one or more of modules 102 from FIG. 1 may, when executed by at least one processor of nodes 202(1)-(6) and/or coordination point 210, facilitate nodes 202(1)-(6) and/or coordination point 210 in managing sub-clusters within dependent clustered computing systems subsequent to partition events. For example, and as will be described in greater detail below, one or more of modules 102 may cause nodes 202(1)-(6) and/or coordination point 210 to (1) identify cluster 204(1) and cluster 204(2), (2) determine that cluster 204(1) depends on cluster 204(2), (3) detect a partition event (e.g., one or more of partition events 212(1)-(3)) that partitions cluster 204(1) into sub-clusters 206(1) and 206(2), (4) determine, in response to detecting the partition event, whether cluster 204(2) is partitioned into multiple sub-clusters (e.g., determine whether cluster 204(2) is partitioned into sub-clusters 206(3) and 206(4)), and (5) make, based at least in part on determining whether cluster 204(2) is partitioned into multiple sub-clusters, a fencing decision for sub-clusters 206(1) and 206(2) of cluster 204(1).

Nodes 202(1)-(6) generally represent any type or form of physical or virtual computing device capable of reading computer-executable instructions. Examples of nodes 202(1)-(6) include, without limitation, laptops, tablets, desktops, servers, cellular phones, Personal Digital Assistants (PDAs), multimedia players, embedded systems, virtual machines, hypervisors, combinations of one or more of the same, exemplary computing system 710 in FIG. 7, or any other suitable computing device.

Figure 4:
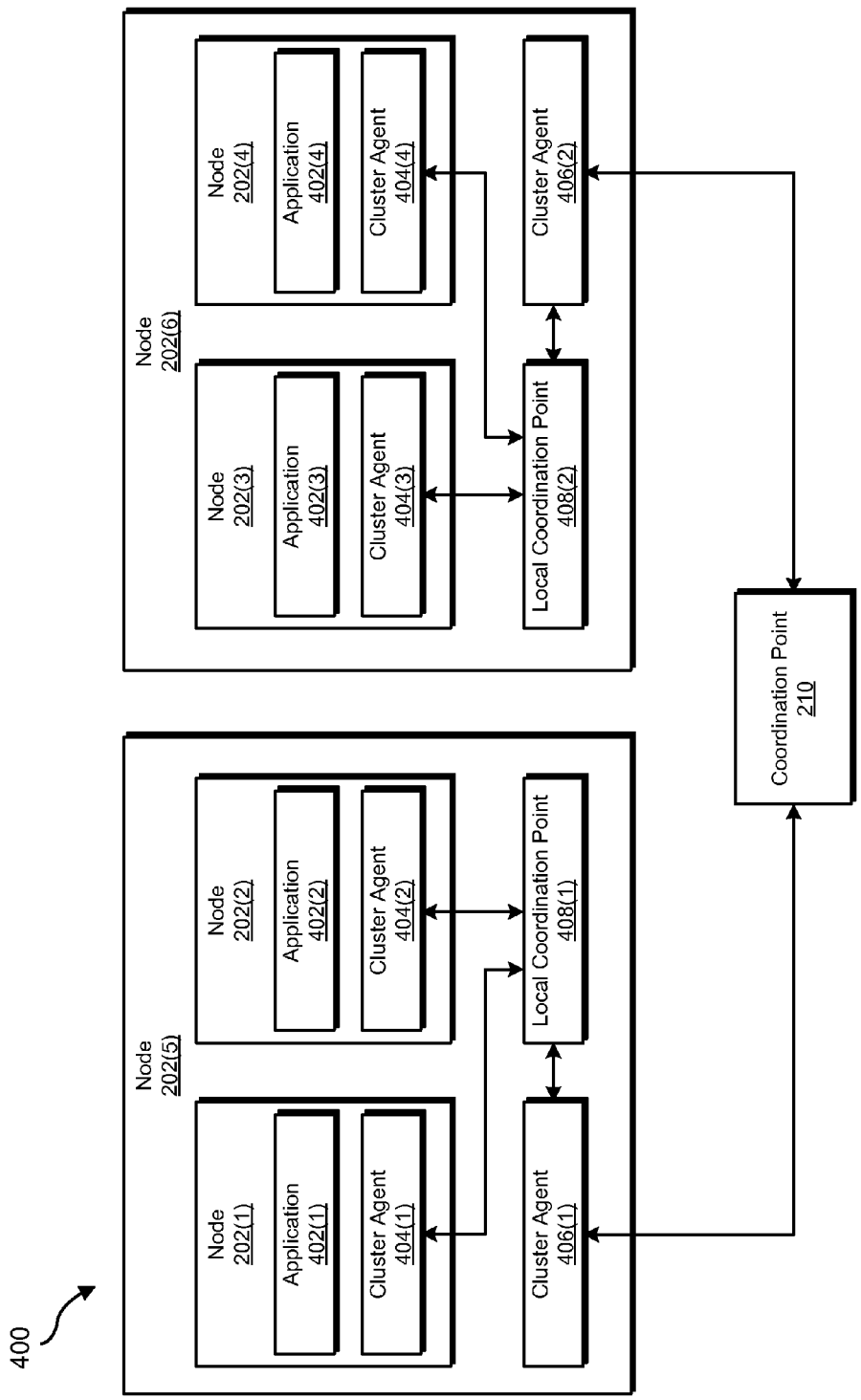
FIG. 4 is a block diagram of an exemplary system for managing sub-clusters within dependent clustered computing systems subsequent to partition events.
Figure 5:
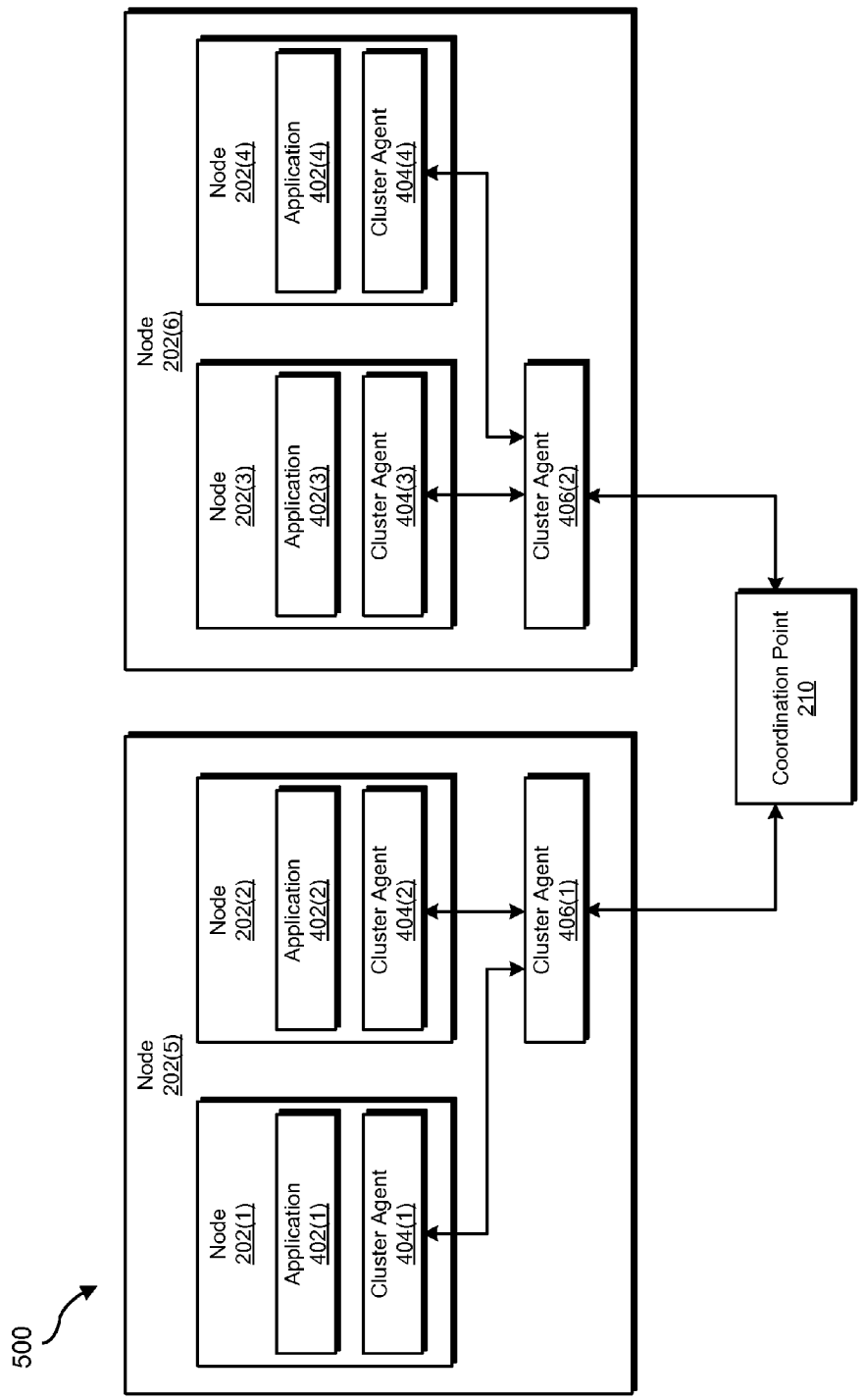
FIG. 5 is a block diagram of an exemplary system for managing sub-clusters within dependent clustered computing systems subsequent to partition events.
Figure 6:
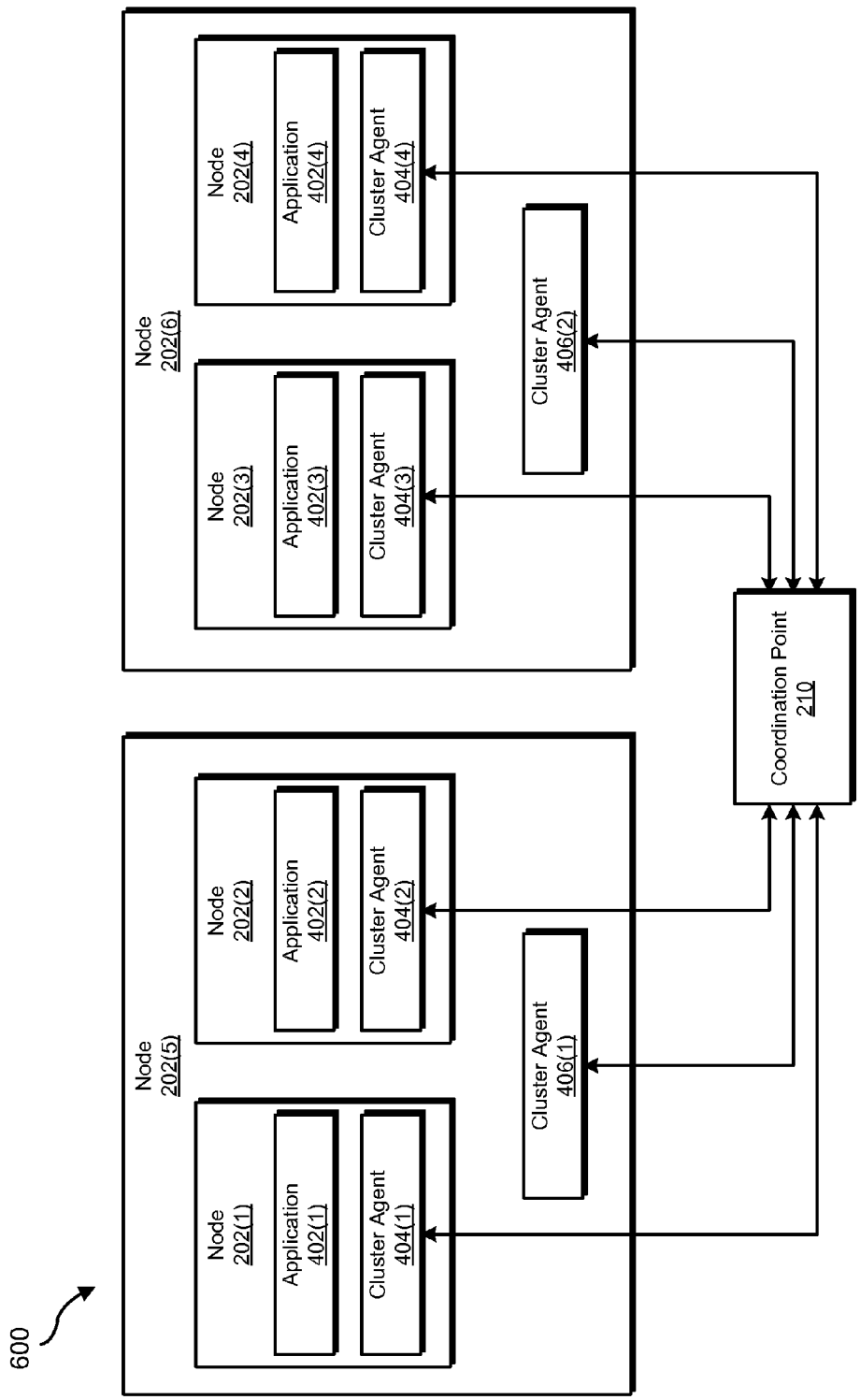
FIG. 6 is a block diagram of an exemplary system for managing sub-clusters within dependent clustered computing systems subsequent to partition events.

In some examples, nodes 202(1)-(4) may be programmed to individually and/or collectively perform tasks by coordinating operations. In one example, nodes 202(1)-(4) may represent an in-guest cluster (e.g., as illustrated in FIGS. 4-6). Similarly, in some examples, nodes 202(5) and 202(6) may be programmed to individually and/or collectively perform tasks by coordinating operations. In one example, node nodes 202(5) and 202(6) may represent an on-host cluster (e.g., as illustrated in FIGS. 4-6).

Clusters 204(1) and 204(2) generally represent a group of two or more nodes (e.g., two or more physical or virtual computing devices) that are capable of communicating with one another via a network. Although not shown, clusters 204(1) and 204(2) may also incorporate shared resources, such as storage devices, and may be programmed to perform one or more tasks. Examples of clusters 204(1) and 204(2) include, without limitation, high-availability clusters, load-balancing clusters, compute clusters, Beowolf clusters, high-performance computing clusters, or any other suitable computing clusters. As shown in FIG. 2, cluster 204(1) may include nodes 202(1)-(4), and cluster 204(2) may include nodes 202(5) and 202(6). In one example, cluster 204(1) may represent an in-guest cluster, and cluster 204(2) may represent an on-host cluster.

Sub-clusters 206(1)-(4) generally represent one or more nodes of a computing cluster that have been partitioned by a partition event. For example, a partition event may partition a computing cluster into multiple sub-clusters (i.e., groups of one or more nodes) that are unable to communicate with one another. While such sub-clusters may be unable to communicate with one another, nodes within a single sub-cluster may still be capable of communicating with one another. As shown in FIG. 2, sub-cluster 206(1) may include nodes 202(1) and 202(2), sub-cluster 206(2) may include nodes 202(3) and 202(4), sub-cluster 206(3) may include node 202(5), and sub-cluster 206(4) may include node 202(6).

Network 208 generally represents any medium or architecture capable of facilitating communication or data transfer. Examples of network 208 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 208 may facilitate communication or data transfer using wireless or wired connections. In one embodiment, network 208 may facilitate communication between nodes 202(1)-(6) and coordination point 210.

Coordination point 210 generally represents any type or form of computing device that is capable of performing or being used to perform fencing decisions (e.g., coordination point 210 may be used to resolve split-brain scenarios for clusters 204(1) and/or 204(2) subsequent to a partition event). For example, coordination point 210 may represent one or more coordination disks and/or one or more coordination servers that can be used to determine fencing decisions. Examples of coordination point 210 include, without limitation, application servers and database servers configured to provide various database services and/or run certain software applications, storage devices (such as disks or disk arrays), laptops, desktops, cellular phones, personal digital assistants (PDAs), multimedia players, embedded systems, combinations of one or more of the same, computing system 710 in FIG. 7, and/or portions of exemplary network architecture 800 in FIG. 8.

Partition events 212(1)-(3) generally represent any communication failure that partitions a computing cluster into multiple sub-clusters that are unable to communicate with one another. In some examples, a communication failure may result from a node failure and/or a communication-infrastructure failure. For example, partition events 212(1) and 212(2) may represent the failure of a communication channel between sub-cluster 206(1) and sub-cluster 206(2) that results in the nodes within sub-cluster 206(1) being unable to communicate with the nodes within sub-cluster 206(2). Similarly, partition events 212(2) and 212(3) may represent the failure of a communication channel between sub-cluster 206(3) and sub-cluster 206(4) that results in the nodes within sub-cluster 206(3) being unable to communicate with the nodes within sub-cluster 206(4).

Figure 3:
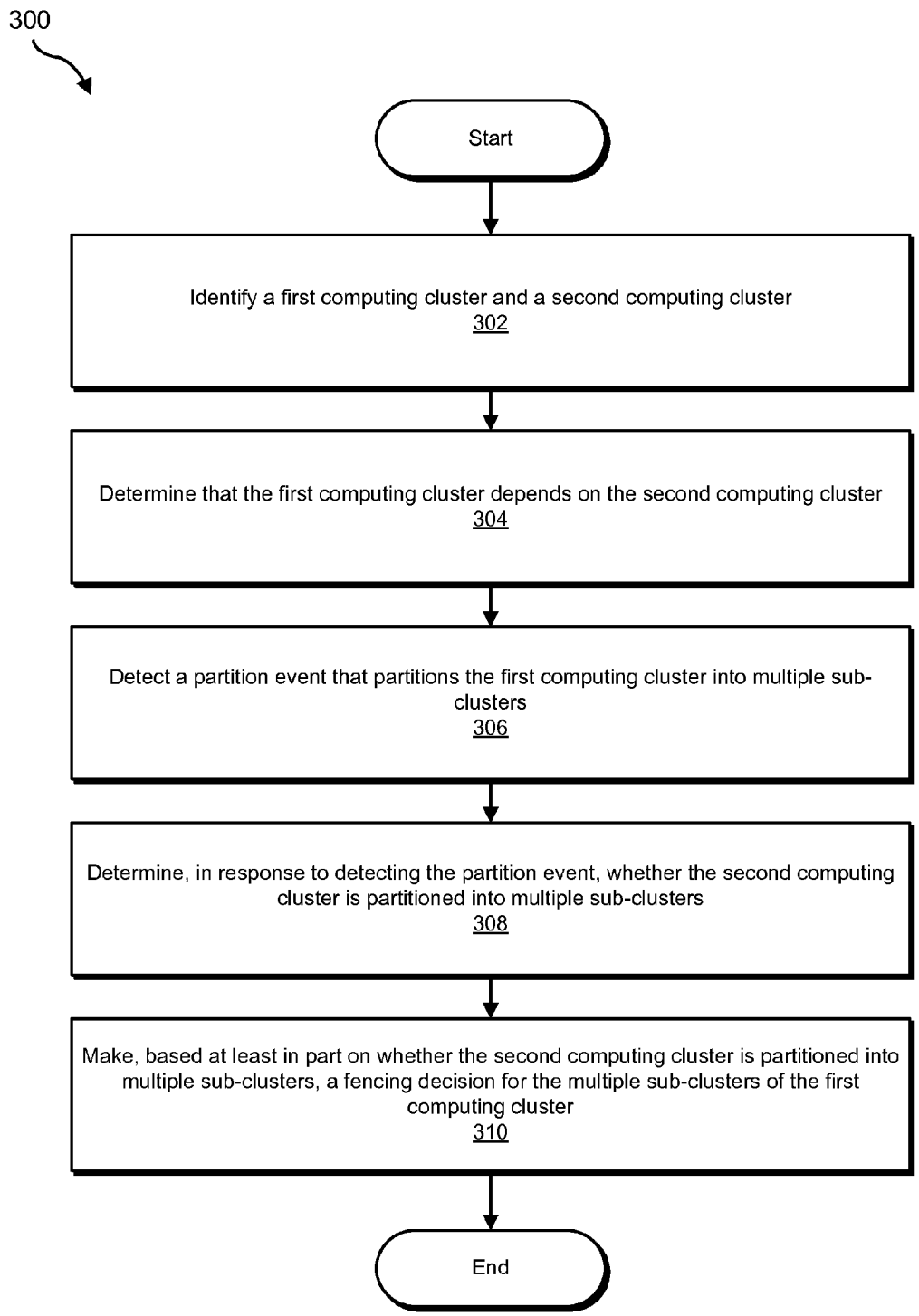
FIG. 3 is a flow diagram of an exemplary method for managing sub-clusters within dependent clustered computing systems subsequent to partition events.

FIG. 3 is a flow diagram of an exemplary computer-implemented method 300 for managing sub-clusters within dependent clustered computing systems subsequent to partition events. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may identify a first computing cluster and a second computing cluster. For example, at step 302 identifying module 104 may, as part of node 202(5), node 202(6), and/or coordination point 210 in FIG. 2, identify cluster 204(1) and cluster 204(2).

The phrase "computing cluster," as used herein, generally refers to a group of two or more nodes (e.g., two or more physical and/or virtual computing devices) that are capable of communicating with one another and/or that individually and/or collectively perform tasks or access shared cluster resources in a coordinated manner. In at least one example, the phrase "computing cluster" may refer to a VERITAS-CLUSTER-SERVER in-guest or on-host cluster.

Computing clusters may be configured in a variety of ways. For example as illustrated in FIGS. 4-6, cluster 204(1) may represent a cluster of virtual machines (e.g., an in-guest cluster), and cluster 204(2) may represent a cluster of hypervisors (e.g., an on-host cluster). As will be explained in greater detail below, FIGS. 4-6 illustrate several ways in which the systems and methods described herein may be configured to manage sub-clusters within dependent clustered computing systems subsequent to partition events.

Returning to FIG. 3, the systems described herein may perform step 302 in any suitable manner. For example, identification module 104 may identify cluster 204(1) and cluster 204(2) upon initialization or configuration of system 200 in FIG. 2. In one example, each node within cluster 204(1) and cluster 204(2) may be configured to register itself with coordination point 210, and identifying module 104 may, as part of coordination point 210, identify cluster 204(1) and cluster 204(2) when their nodes register with coordination point 210.

Additionally and/or alternatively, each node within cluster 204(1) may be configured to register itself with at least one node of cluster 204(2) (e.g., each node within cluster 204(1) may be configured to register itself with the node of cluster 204(2) on which it runs), and identifying module 104 may, as part of the nodes of cluster 204(2), identify cluster 204(1) when its nodes register with the nodes of cluster 204(2). In some examples, each node of an in-guest cluster may be configured to register with the node of the on-host cluster on which the node runs. In at least one example, this registration process may be performed by leveraging CLUSTER EXTENDER (CE) components (e.g., CE-CORE and/or CE-CONNECT) of the in-guest and/or the on-host cluster.

In some examples, identifying module 104 may store information about cluster 204(1) and cluster 204(2) to first-cluster data 122 and/or second-cluster data 124. For example, identifying module 104 may store, for each node within cluster 204(1), an identification address (such as an IP address or a MAC address), a physical or virtual location, and/or node registration key to first-cluster data 122. Similarly, identifying module 104 may store, for each node within cluster 204(2), an identification address (such as an IP address or a MAC address), a physical or virtual location, and/or node registration key to second-cluster data 124. In some examples, identifying module 104 may identify clusters 204(1) and 204(2) using the configuration information of clusters 204(1) and 204(2) contained within first-cluster data 122 and/or second-cluster data 124.

At step 304, one or more of the systems described herein may determine that the first computing cluster depends on the second computing cluster. For example, at step 304 dependency-determining module 106 may, as part of node 202(5), node 202(6), and/or coordination point 210 in FIG. 2, determine that cluster 204(1) depends on cluster 204(2).

In general, a first computing cluster may be considered dependent on a second computing cluster if the first computing cluster is hosted by the second computing cluster. For example, a cluster of virtual machines may depend on the cluster of hypervisors on which it runs. Additionally and/or alternatively, a first computing cluster may be considered dependent on a second computing cluster if a fencing decision for the second computing cluster may affect the availability of nodes of the first computing cluster. For example, a first computing cluster and a second computing cluster may span the same geographically diverse sites, and applications running on the first computing cluster may be required to access applications running on the second computing cluster. In these circumstances, if both computing clusters are affected by the same network-partition event, a fencing decision for the second computing cluster (e.g., which side of the network-partition event should remain active and which side should be shut down) may affect the availability of nodes of the first computing cluster.

Returning to FIG. 3, the systems described herein may perform step 304 in any suitable manner. In one example, dependency-determining module 106 may determine that cluster 204(1) depends on cluster 204(2) by determining that cluster 204(1) is hosted by cluster 204(2). For example, if cluster 204(1) represents an in-guest cluster, and cluster 204(2) represents the on-host cluster on which cluster 204(1) runs, dependency-determining module 106 may determine that cluster 204(1) depends on cluster 204(2) by determining that cluster 204(1) runs on cluster 204(2).

In another example, identification module 104 may identify cluster 204(1) and cluster 204(2) upon initialization or configuration of system 200 in FIG. 2. For example, each node within cluster 204(1) and cluster 204(2) may be configured to register itself with coordination point 210 and provide information to coordination point 210 that indicates whether the node depends on a node of another computing cluster. As such, dependency-determining module 106 may, as part of coordination point 210, determine that cluster 204(1) depends on cluster 204(2) when nodes of cluster 204(1) register with coordination point 210.

Additionally and/or alternatively, each node within cluster 204(1) may be configured to register itself with the node of cluster 204(2) on which it runs, and dependency-determining module 106 may, as part of the nodes of cluster 204(2), determine that cluster 204(1) depends on cluster 204(2) when its nodes register with the nodes of cluster 204(2).

In at least one example, dependency-determining module 106 may track how cluster 204(1) depends on cluster 204(2). For example, dependency-determining module 106 may track the node of cluster 204(2) on which each node of cluster 204(1) runs.

At step 306, one or more of the systems described herein may detect a partition event that partitions the first computing cluster into multiple sub-clusters. For example, at step 306 partition-detecting module 108 may, as part of one or more of nodes 202(1)-(6) in FIG. 2, detect one or more of partition events 212(1)-(3) that partitions cluster 204(1) into sub-clusters 206(1) and 206(2).

As used herein, the term "partition event" generally refers to any communication failure that partitions a cluster into multiple sub-clusters (i.e., groups of one or more nodes) that are unable to communicate with one another. A communication failure may result from a node failure and/or a communication-infrastructure failure. The term "sub-cluster," as used herein, generally refers to one or more nodes of a cluster that have been partitioned by a partition event.

In some examples, a computing cluster may use node-to-node communication channels (e.g., SYMANTEC'S LOW-LATENCY TRANSPORT (LLT) in VERITAS CLUSTER SERVER and/or SYMANTEC'S GLOBAL ATOMIC BROADCAST (GAB) in VERITAS CLUSTER SERVER) in order to replicate the current state of all cluster resources from each cluster node to all other nodes in the cluster. A computing cluster may also use node-to-node communication channels to exchange heartbeat messages (e.g., messages transmitted at regular intervals to indicate that a node and its connections are operating normally). In some examples, the failure of a node to transmit a heartbeat message may indicate that the node has failed. On the other hand, the failure of a node to receive a heartbeat message from other nodes in the same cluster may indicate that the node has been partitioned from the other nodes in the cluster.

Returning to FIG. 3, the systems described herein may perform step 306 in any suitable manner. In one example, partition-detecting module 108 may detect a partition event that partitions cluster 204(1) into multiple sub-clusters by detecting that at least one node in cluster 204(1) failed to receive a heartbeat message from other nodes in cluster 204(1). For example, partition-detecting module 108 may, as part of nodes 202(1) and 202(2), identify partition event 212(1) or 212(2) by determining that nodes 202(1) and 202(2) failed to receive heartbeat messages from nodes 202(3) and 202(4) but did receive heartbeat messages from each other and/or by determining that nodes 202(3) and 202(4) failed to receive heartbeat messages from nodes 202(1) and 202(2) but did receive heartbeat messages from each other.

Additionally or alternatively, the nodes of cluster 204(1) may be configured so that a node from each sub-cluster within cluster 204(1) may, in response to detecting a partition event, request a fencing decision from a coordination point (e.g., race to make reservations with one or more coordination disks and/or coordination servers), and partition-detecting module 108 may, as part of the coordination point, detect a partition event that partitions cluster 204(1) into multiple sub-clusters by receiving, from a sub-cluster of cluster 204(1), the request for the fencing decision.

At step 308, one or more of the systems described herein may determine, in response to detecting the partition event, whether the second cluster is partitioned into multiple sub-clusters. For example, at step 308 partition-detecting module 108 may, as part of node 202(5), node 202(6), and/or coordination point 210 in FIG. 2, determine, in response to detecting one or more of partition events 212(1)-(3), whether cluster 204(2) is partitioned into multiple sub-clusters.

The systems described herein may perform step 308 in any suitable manner. In one example, partition-detecting module 108 may determine that cluster 204(2) has not been partitioned into multiple sub-clusters by determining that the nodes in cluster 204(2) are able to communicate over a node-to-node communication channel.

Additionally and/or alternatively, partition-detecting module 108 may determine that cluster 204(2) has been partitioned into multiple sub-clusters by determining that the nodes in cluster 204(2) are unable to communicate over a node-to-node communication channel. For example, partition-detecting module 108 may detect that cluster 204(2) has been partitioned into multiple sub-clusters by determining that at least one node in cluster 204(2) failed to receive a heartbeat message from other nodes in cluster 204(2). For example, partition-detecting module 108 may, as part of nodes 202(5) and 202(6), identify partition event 212(2) or 212(3) by determining that node 202(5) failed to receive a heartbeat message from node 202(6) and/or by determining that node 202(6) failed to receive a heartbeat message from node 202(5).

Additionally or alternatively, the nodes of cluster 204(2) may be configured so that a node from each sub-cluster within cluster 204(2) may, in response to detecting a partition event, request a fencing decision from a coordination point (e.g., race to make reservations with one or more coordination disks and/or coordination servers), and partition-detecting module 108 may, as part of the coordination point, determine that cluster 204(2) has been partitioned into multiple sub-clusters by receiving, from a sub-cluster of cluster 204(2), the request for the fencing decision.

At step 310, one or more of the systems described herein may make, based at least in part on determining whether the second computing cluster is partitioned into multiple sub-clusters, a fencing decision for the multiple sub-clusters of the first computing cluster. For example, at step 310 fencing module 110 may, as part of node 202(5), node 202(6), and/or coordination point 210 in FIG. 2, make, based at least in part on determining whether cluster 204(2) is partitioned into multiple sub-clusters, a fencing decision for sub-cluster 206(1) and sub-cluster 206(2).

As used herein, the phrase "fencing decision" may refer to any method for selecting one sub-cluster of a computing cluster to take over the responsibilities for the entire computing cluster and/or for isolating the other sub-clusters of the computing cluster from shared cluster resources. In some examples, a response to a request for a fencing decision may instruct the nodes of a winning sub-cluster to take over the responsibilities for the computing cluster to which the winning sub-cluster belongs and/or may instruct the nodes of a losing sub-cluster to shut down.

The systems described herein may perform step 310 in any suitable manner. For example, fencing module 110 may make fencing decisions for clusters 204(1) and/or 204(2) using a first-come-first-served (FCFS) policy (e.g., a policy where the first sub-cluster to reach a coordination point is selected to take over the responsibilities for the entire computing cluster to which it belongs and where subsequent sub-clusters are isolated from shared cluster resources). Additionally and/or alternatively, fencing module 110 may make fencing decisions for clusters 204(1) and/or 204(2) using fencing policies based on application priority, node characteristics, and/or sub-cluster characteristics (e.g., the number of nodes available within a sub-cluster).

Fencing module 110 may make fencing decisions in a variety of contexts. FIGS. 4-6 illustrate several configurations of system 200 in FIG. 2 in which fencing module 110 may make fencing decisions for clusters 204(1) and/or 204(2). For example, FIG. 4 illustrates how fencing module 110 may make fencing decisions for cluster 204(1) at one or more coordination points hosted by cluster 204(2), and FIGS. 5 and 6 illustrate how fencing module 110 may make fencing decisions for cluster 204(1) as part of coordination point 210. As shown in FIGS. 4-6, cluster 204(1) (e.g., nodes 202(1)-(4)) may represent an in-guest cluster configured to ensure that applications 402(1)-(4) are highly available, and cluster 204(2) (e.g., nodes 202(5) and 202(6)) may represent an on-host cluster configured to run nodes 202(1)-(4) and ensure that nodes 202(1)-(4) are highly available.

In the examples provided in FIGS. 4-6, each node within nodes 202(1)-(6) may include a cluster agent (e.g., cluster agents 404(1)-(4) and cluster agents 406(1) and 406(2)). These cluster agents may be configured to manage the cluster functionalities of clusters 204(1) and 204(2) (e.g., starting, stopping, and monitoring cluster resources, exchanging heartbeat messages, and/or requesting fencing decisions in response to partition events). In some examples, the cluster agents may communicate via node-to-node communication channels (e.g., SYMANTEC'S LOW-LATENCY TRANSPORT (LLT) in VERITAS CLUSTER SERVER and/or SYMANTEC'S GLOBAL ATOMIC BROADCAST (GAB) in VERITAS CLUSTER SERVER). In some of the examples provided in FIGS. 4-6, fencing module 110 may be configured to perform fencing decisions for clusters 204(1) and/or 204(2) as part of coordination point 210.

FIG. 4 is a block diagram of an exemplary computing-cluster configuration 400. As shown in FIG. 4, node 202(5) may host a local coordination point 408(1), and node 202(6) may host a local coordination point 408(2). In this example, local coordination point 408(1) may leverage the CE-CORE components of node 202(5) to provide nodes 202(1) and 202(2) with enhanced coordination point functionality (e.g., fencing module 110 may, as part of local coordination point 408(1), make fencing decisions for nodes 202(1) and 202(2)). Like local coordination point 408(1), local coordination point 408(2) may leverage the CE-CORE components of node 202(6) to provide nodes 202(3) and 202(4) with enhanced coordination point functionality (e.g., fencing module 110 may, as part of local coordination point 408(2), make fencing decisions for nodes 202(3) and 202(4)).

Prior to partition events 212(1)-(3), cluster agents 404(1) and 404(2) may have registered with local coordination point 408(1), cluster agents 404(3) and 404(4) may have registered with local coordination point 408(2), and cluster agents 406(1) and 406(2) may have registered with coordination point 210. As a result, local coordination point 408(1), coordination point 408(2), and coordination point 210 may know that cluster 204(1) depends on cluster 204(2).

In response to detecting a partition event that partitions cluster 204(1) into sub-clusters 206(1) and 206(2), cluster agents 404(1) and 404(2) of sub-cluster 206(1) may select a cluster agent to request a fencing decision for sub-clusters 206(1) and 206(2) from local coordination point 408(1), and cluster agents 404(3) and 404(4) of sub-cluster 206(2) may select a cluster agent to similarly request a fencing decision for sub-clusters 206(1) and 206(2) from local coordination point 408(2).

In response to receiving requests for fencing decisions for sub-clusters 206(1) and 206(2), partition-detecting module 108 may, as part of local coordination points 408(1) and 408(2), attempt to communicate via the node-to-node communication channels of nodes 202(5) and 202(6) in order to determine if cluster 204(2) has been partitioned into multiple sub-clusters.

If partition-detecting module 108 determines that cluster 204(2) has not been partitioned into multiple sub-clusters, fencing module 110 may, as part of local coordination points 408(1) and 408(2), make and return a fencing decision to sub-clusters 206(1) and 206(2). On the other hand, if partition-detecting module 108 determines that cluster 204(2) has been partitioned into multiple sub-clusters (e.g., sub-clusters 206(3) and 206(4)), local coordination points 408(1) and 408(2) may wait for cluster agents 406(1) and 406(2) to request and receive a fencing decision for cluster 204(2) from coordination point 210. In some examples, fencing module 110 may, as part of coordination point 210, make a fencing decision for cluster 204(2) based at least in part on the state of cluster 204(1).

In response to receiving a fencing decision for cluster 204(2) from coordination point 210 via cluster agents 406(1) and 406(2), fencing module 110 may, as part of local coordination points 408(1) and 408(2), make and return a compatible fencing decision for sub-clusters 206(1) and 206(2) based on the fencing decision for cluster 204(2).

FIG. 5 is a block diagram of an exemplary computing-cluster configuration 500. In this example, fencing module 110 may be configured to perform fencing decisions for clusters 204(1) and/or 204(2) as part of coordination point 210. For example, prior to partition events 212(1)-(3), cluster agents 404(1)-(4) and cluster agents 406(1) and 406(2) may have registered with coordination point 210. As a result, coordination point 210 may know that cluster 204(1) depends on cluster 204(2).

In this example, while cluster agents 404(1)-(4) may have registered with coordination point 210, cluster agents 404(1)-(4) may be configured to request fencing decisions for cluster 204(1) via cluster agents 406(1) and 406(2). For example, cluster agent 406(1) may be configured to relay requests for fencing decisions from cluster agents 404(1) and 404(2) to coordination point 210, and cluster agent 406(2) may be configured to relay requests for fencing decisions from cluster agents 404(3) and 404(4) to coordination point 210.

In this example, cluster agent 406(1) may leverage the CE-CORE components of node 202(5) to provide nodes 202(1) and 202(2) with a proxy through which nodes 202(1) and 202(2) may request fencing decisions from coordination point 210. Similarly, cluster agent 406(2) may leverage the CE-CORE components of node 202(6) to provide nodes 202(3) and 202(4) with a proxy through which nodes 202(3) and 202(4) may request fencing decisions from coordination point 210.

In response to detecting a partition event that partitions cluster 204(1) into sub-clusters 206(1) and 206(2), cluster agents 404(1) and 404(2) of sub-cluster 206(1) may select a cluster agent to request a fencing decision from coordination point 210 via cluster agent 406(1), and cluster agents 404(3)

and 404(4) of sub-cluster 206(2) may select a cluster agent to similarly request a fencing decision from coordination point 210 via cluster agent 406(2).

In response to receiving requests for fencing decisions from a cluster agent from either of sub-clusters 206(1) and 206(2), partition-detecting module 108 may, as part of cluster agents 406(1) and/or 406(2), attempt to communicate via the node-to-node communication channels of nodes 202(5) and 202(6) in order to determine if cluster 204(2) has been partitioned by the partition event into multiple sub-clusters.

If partition-detecting module 108 determines that cluster 204(2) has not been partitioned into multiple sub-clusters, fencing module 110 may, as part of cluster agents 406(1) and 406(2), relay the requests for the fencing decision for sub-clusters 206(1) and 206(2) to coordination point 210. In at least one example, cluster agents 406(1) and 406(2) may wait for a predetermined amount of time before relaying the requests for the fencing decision for sub-clusters 206(1) and 206(2) to coordination point 210 to ensure that all requests for fencing decisions for cluster 204(1) have been received. In this example, fencing module 110 may, as part of coordination point 210, make and return via cluster agents 406(1) and 406(2) a fencing decision for sub-clusters 206(1) and 206(2).

On the other hand, if partition-detecting module 108 determines that cluster 204(2) has been partitioned into multiple sub-clusters (e.g., sub-clusters 206(3) and 206(4)), cluster agents 406(1) and 406(2) may generate a combined request for fencing decisions for sub-clusters 206(1)-(4) and may send the combined request to coordination point 210. In at least one example, cluster agents 406(1) and 406(2) may wait for a predetermined amount of time before sending the combined request to ensure that all requests for fencing decisions for cluster 204(1) have been received and to ensure that only one combined request is sent to coordination point 210.

In this example, fencing module 110 may, as part of coordination point 210, make compatible fencing decisions for sub-clusters 206(1)-(4) based at least in part on knowing that cluster 204(1) depends on cluster 204(2). Fencing module 110 may then return the fencing decisions for sub-clusters 206(1)-(4) to sub-clusters 206(1)-(4) via cluster agents 406(1) and 406(2).

FIG. 6 is a block diagram of an exemplary computing-cluster configuration 600. In this example, fencing module 110 may be configured to perform fencing decisions for clusters 204(1) and/or 204(2) as part of coordination point 210. For example, prior to partition events 212(1)-(3), cluster agents 404(1)-(4) and cluster agents 406(1) and 406(2) may have registered with coordination point 210. As a result, coordination point 210 may know that cluster 204(1) depends on cluster 204(2).

In this example, cluster agents 404(1)-(4) may be configured to request fencing decisions for cluster 204(1) directly from coordination point 210. Similarly, cluster agents 406(1) and 406(2) may be configured to request fencing decisions for cluster 204(1) directly from coordination point 210.

In response to detecting a partition event that partitions cluster 204(1) into sub-clusters 206(1) and 206(2), cluster agents 404(1) and 404(2) of sub-cluster 206(1) may select a cluster agent to request a fencing decision for sub-clusters 206(1) and 206(2) directly from coordination point 210, and cluster agents 404(3) and 404(4) of sub-cluster 206(2) may select a cluster agent to similarly request a fencing decision from coordination point 210. In this example, fencing module 110 may, as part of coordination point 210, make and return a fencing decision for sub-clusters 206(1) and 206(2).

In at least one example, fencing module 110 may wait for a predetermined amount of time before making the fencing decision for sub-clusters 206(1) and 206(2) to ensure that any requests for fencing decisions for sub-clusters 206(3) and 206(4) have also been received. For example, in response to detecting a partition event that partitions cluster 204(2) into sub-clusters 206(3) and 206(4), cluster agents 406(1) and 406(2) may request a fencing decision for cluster 204(2) from coordination point 210. In this example, fencing module 110 may, as part of coordination point 210, make compatible fencing decisions for sub-clusters 206(1)-(4) based at least in part on knowing that cluster 204(1) depends on cluster 204(2). Fencing module 110 may then return the fencing decisions for sub-clusters 206(1)-(4) to sub-clusters 206(1)-(4).

As explained above, by identifying when a first computing cluster depends on a second computing cluster, the systems and methods described herein may coordinate fencing decisions for the first and second computing clusters. Furthermore, in some examples, by identifying when an in-guest cluster is running on an on-host cluster, these systems and methods may coordinate fencing decisions for the in-guest and on-host clusters. Moreover, by coordinating fencing decisions for in-guest and on-host clusters, these systems and methods may improve application availability within the in-guest and on-host clusters. For example, the systems and methods described herein may (1) identify an in-guest cluster running on an on-host cluster, (2) detect a partition event that partitions the in-guest cluster and the on-host cluster into multiple sub-clusters, (3) make a fencing decision for the multiple sub-clusters of the on-host cluster, and (4) make, based at least on the fencing decision for the multiple sub-clusters of the on-host cluster, a fencing decision for the multiple sub-clusters of the in-guest cluster.

Figure 7:
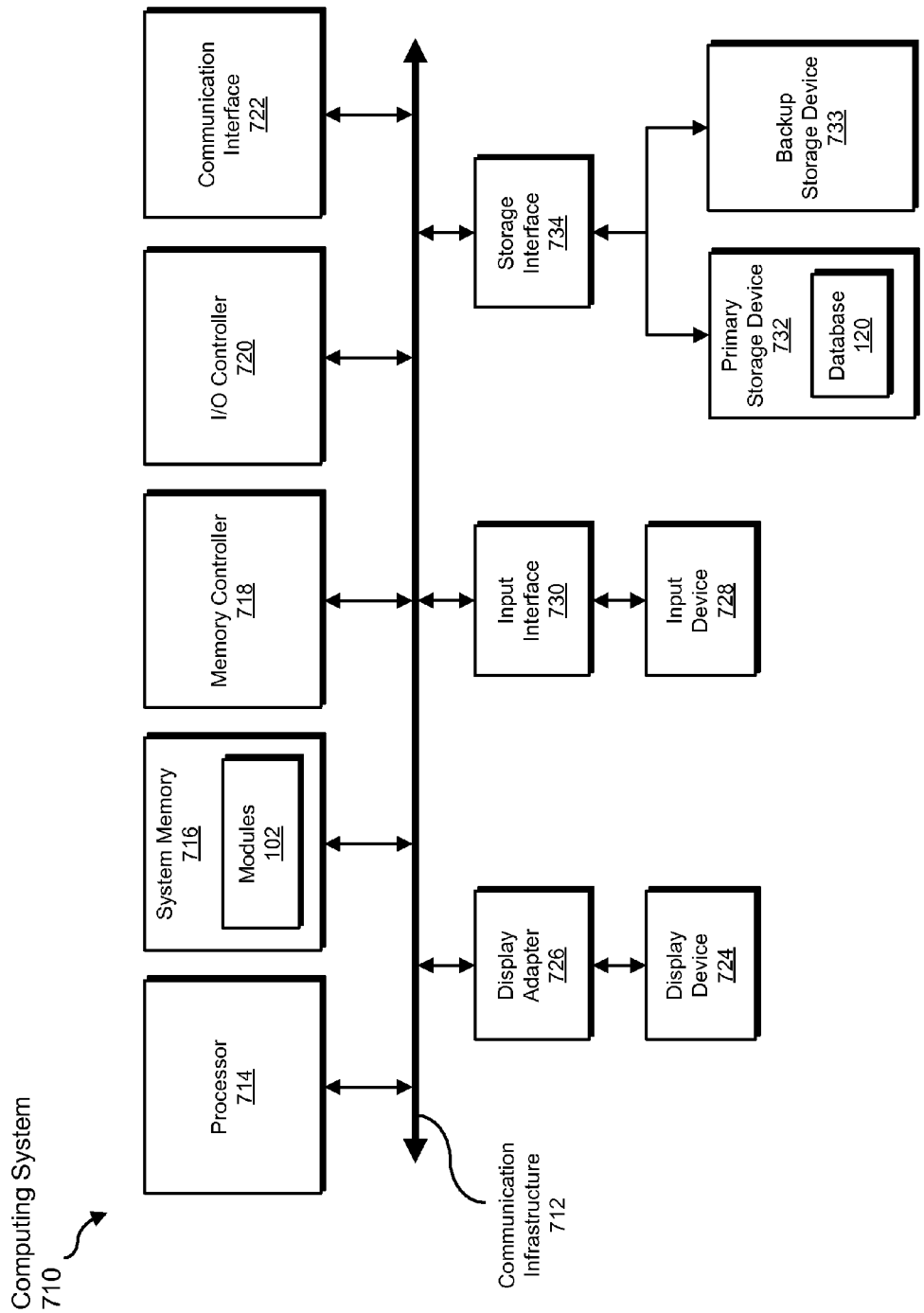
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the identifying, determining, detecting, making, receiving, sending, relaying, waiting, and tracking steps described herein. All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
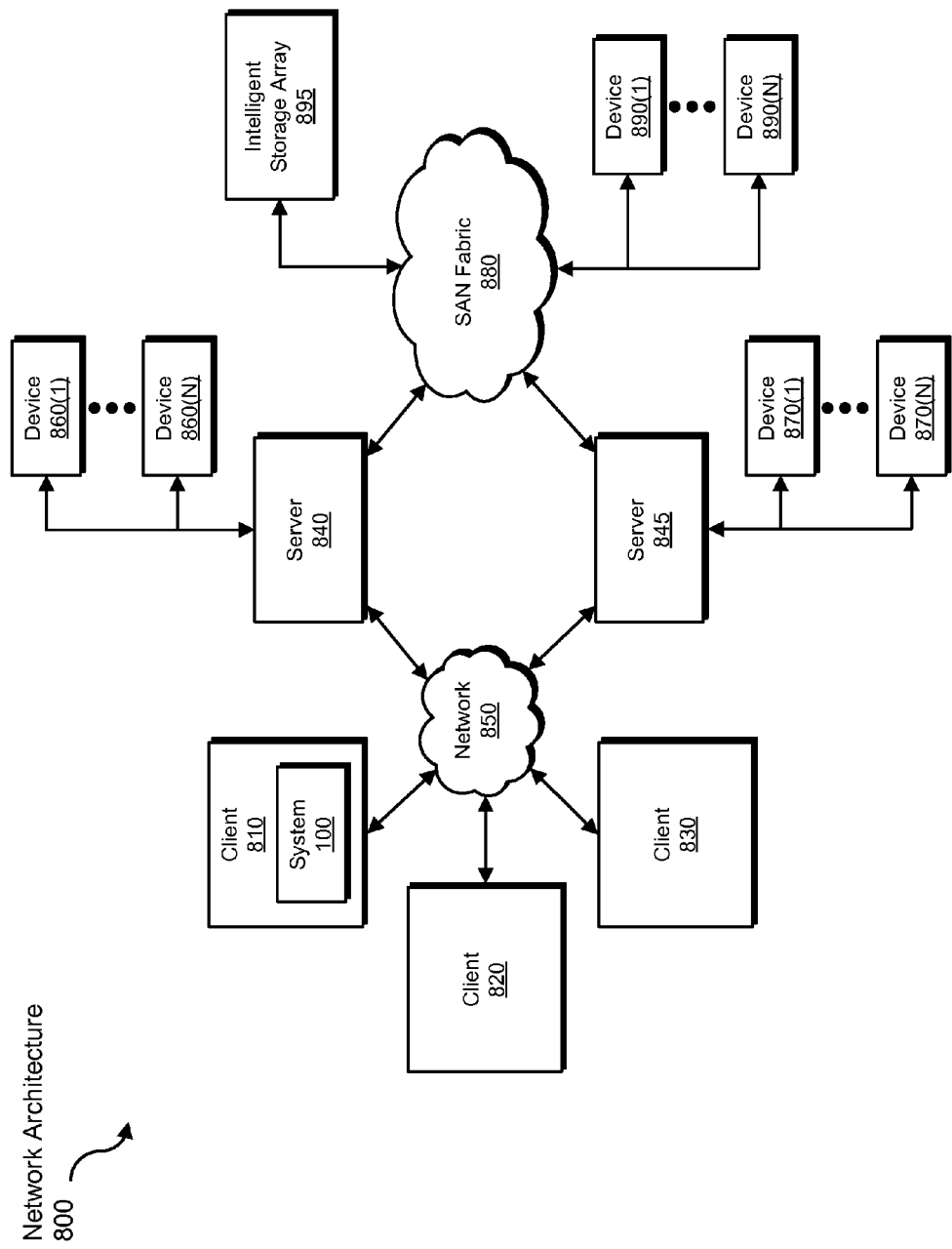
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the identifying, determining, detecting, making, receiving, sending, relaying, waiting, and tracking steps disclosed herein. All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for managing sub-clusters within dependent clustered computing systems subsequent to partition events.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a request for a fencing decision for multiple sub-clusters of a first computing cluster that depends on a second computing cluster, transform the request for the fencing decision into the fencing decision based at least in part on whether the second computing cluster is partitioned into multiple sub-clusters, output a result of the transformation to the multiple sub-clusters of the first computing cluster, use the result of the transformation to cause all but one sub-cluster of the multiple sub-clusters of the first computing cluster to stop performing tasks of the first computing cluster, and store the result of the transformation to a database for storing information about the first computing cluster. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing sub-clusters within dependent clustered computing systems subsequent to partition events, at least a portion of the method being performed by a computing device comprising at least one processor, the method comprising:
   identifying a first computing cluster and a second computing cluster;
   determining that the first computing cluster comprises a virtual machine that is hosted by the second computing cluster such that the first computing cluster depends on the second computing cluster;
   detecting a partition event that partitions the first computing cluster into multiple sub-clusters that are unable to communicate with one another;
   determining, in response to detecting the partition event, whether the second computing cluster is partitioned into multiple sub-clusters;
   making, based at least in part on determining whether the second computing cluster is partitioned into multiple sub-clusters, a fencing decision for the multiple sub-clusters of the first computing cluster.

2. The computer-implemented method of claim 1, wherein making the fencing decision for the multiple sub-clusters of the first computing cluster comprises receiving, at a node of the second computing cluster and from a node of a sub-cluster of the first computing cluster, a request for the fencing decision for the multiple sub-clusters of the first computing cluster.

3. The computer-implemented method of claim 2, wherein making the fencing decision for the multiple sub-clusters of the first computing cluster further comprises making, at the node of the second computing cluster and based at least in part on determining that the second computing cluster is not partitioned into multiple sub-clusters, the fencing decision for the multiple sub-clusters of the first computing cluster.

4. The computer-implemented method of claim 2, wherein making the fencing decision for the multiple sub-clusters of the first computing cluster further comprises:
   sending, from the node of the second computing cluster and in response to determining that the second computing cluster is partitioned into multiple sub-clusters, a request to a central coordination point for a fencing decision for the multiple sub-clusters of the second computing cluster;

receiving, at the node of the second computing cluster, the fencing decision for the multiple sub-clusters of the second computing cluster;

making, at the node of the second computing cluster and based at least in part on the fencing decision for the multiple sub-clusters of the second computing cluster, the fencing decision for the multiple sub-clusters of the first computing cluster.

5. The computer-implemented method of claim 2, wherein making the fencing decision for the multiple sub-clusters of the first computing cluster further comprises:

relaying, at the node of the second computing cluster and to a central coordination point, the request for the fencing decision for the multiple sub-clusters of the first computing cluster;

making, at the central coordination point, the fencing decision for the multiple sub-clusters of the first computing cluster.

6. The computer-implemented method of claim 5, wherein the request for the fencing decision for the multiple sub-clusters of the first computing cluster is relayed to the central coordination point after waiting for a predetermined amount of time.

7. The computer-implemented method of claim 2, wherein making the fencing decision for the multiple sub-clusters of the first computing cluster further comprises:

sending, at the node of the second computing cluster and in response to determining that the second computing cluster is partitioned into multiple sub-clusters, a combined request to a central coordination point for the fencing decision for the multiple sub-clusters of the first computing cluster and a fencing decision for the multiple sub-clusters of the second computing cluster;

making, at the central coordination point and in response to the combined request from the node of the second computing cluster, the fencing decision for the multiple sub-clusters of the first computing cluster.

8. The computer-implemented method of claim 2, wherein:

the node of the second computing cluster comprises a hypervisor;

the node of the sub-cluster of the first computing cluster comprises the virtual machine;

determining that the virtual machine is hosted by the second computing cluster comprises determining that the virtual machine is running on the hypervisor;

the request for the fencing decision for the multiple sub-clusters of the first computing cluster is received over a direct communication channel between the hypervisor and the virtual machine.

9. The computer-implemented method of claim 1, wherein:

the first computing cluster comprises a cluster of virtual machines that includes the virtual machine;

the second computing cluster comprises a cluster of hypervisors;

determining that the virtual machine is hosted by the second computing cluster comprises determining that the cluster of virtual machines runs on the cluster of hypervisors.

10. The computer-implemented method of claim 9, wherein determining that the cluster of virtual machines runs on the cluster of hypervisors comprises tracking the node of the cluster of hypervisors on which each node within the cluster of virtual machines runs.

11. A system for managing sub-clusters within dependent clustered computing systems subsequent to partition events, the system comprising:

an identifying module, stored in memory, that identifies a first computing cluster and a second computing cluster;

a dependency-determining module, stored in memory, that determines that the first computing cluster comprises a virtual machine that is hosted by the second computing cluster such that the first computing cluster depends on the second computing cluster;

a partition-detecting module, stored in memory, that:
detects a partition event that partitions the first computing cluster into multiple sub-clusters that are unable to communicate with one another;
determines, in response to detecting the partition event, whether the second computing cluster is partitioned into multiple sub-clusters;

a fencing module, stored in memory, that makes, based at least in part on determining whether the second computing cluster is partitioned into multiple sub-clusters, a fencing decision for the multiple sub-clusters of the first computing cluster;

at least one processor configured to execute the identifying module, the dependency-determining module, the partition-detecting module, and the fencing module.

12. The system of claim 11, wherein the fencing module makes the fencing decision for the multiple sub-clusters of the first computing cluster by receiving, at a node of the second computing cluster and from a node of a sub-cluster of the first computing cluster, a request for the fencing decision for the multiple sub-clusters of the first computing cluster.

13. The system of claim 12, wherein the fencing module makes the fencing decision for the multiple sub-clusters of the first computing cluster further by making, at the node of the second computing cluster and based at least in part on determining that the second computing cluster is not partitioned into multiple sub-clusters, the fencing decision for the multiple sub-clusters of the first computing cluster.

14. The system of claim 12, wherein the fencing module makes the fencing decision for the multiple sub-clusters of the first computing cluster further by:

sending, from the node of the second computing cluster and in response to determining that the second computing cluster is partitioned into multiple sub-clusters, a request to a central coordination point for a fencing decision for the multiple sub-clusters of the second computing cluster;

receiving, at the node of the second computing cluster, the fencing decision for the multiple sub-clusters of the second computing cluster;

making, at the node of the second computing cluster and based at least in part on the fencing decision for the multiple sub-clusters of the second computing cluster, the fencing decision for the multiple sub-clusters of the first computing cluster.

15. The system of claim 12, wherein the fencing module makes the fencing decision for the multiple sub-clusters of the first computing cluster further by:

relaying, at the node of the second computing cluster and to a central coordination point, the request for the fencing decision for the multiple sub-clusters of the first computing cluster;

making, at the central coordination point, the fencing decision for the multiple sub-clusters of the first computing cluster.

16. The system of claim 15, wherein the fencing module waits for a predetermined amount of time before relaying the request for the fencing decision for the multiple sub-clusters of the first computing cluster.

17. The system of claim 12, wherein the fencing module makes the fencing decision for the multiple sub-clusters of the first computing cluster further by:
   sending, at the node of the second computing cluster and in response to determining that the second computing cluster is partitioned into multiple sub-clusters, a combined request to a central coordination point for the fencing decision for the multiple sub-clusters of the first computing cluster and a fencing decision for the multiple sub-clusters of the second computing cluster;
   making, at the central coordination point and in response to the combined request from the node of the second computing cluster, the fencing decision for the multiple sub-clusters of the first computing cluster.

18. The system of claim 12, wherein:
   the node of the second computing cluster comprises a hypervisor;
   the node of the sub-cluster of the first computing cluster comprises the virtual machine;
   the dependency-determining module determines that the virtual machine is hosted by the second computing cluster by determining that the virtual machine is running on the hypervisor;
   the request for the fencing decision for the multiple sub-clusters of the first computing cluster is received over a direct communication channel between the hypervisor and the virtual machine.

19. The system of claim 11, wherein:
   the first computing cluster comprises a cluster of virtual machines that includes the virtual machine;
   the second computing cluster comprises a cluster of hypervisors;
   the dependency-determining module determines that the virtual machine is hosted by the second computing cluster by determining that the cluster of virtual machines runs on the cluster of hypervisors.

20. A non-transitory computer-readable medium comprising one or more computer-executable instructions that, when executed by at least one processor of a computing device, cause the computing device to:
   identify a first computing cluster and a second computing cluster;
   determine that the first computing cluster comprises a virtual machine that is hosted by the second computing cluster such that the first computing cluster depends on the second computing cluster;
   detect a partition event that partitions the first computing cluster into multiple sub-clusters that are unable to communicate with one another;
   determine, in response to detecting the partition event, whether the second computing cluster is partitioned into multiple sub-clusters;
   make, based at least in part on determining whether the second computing cluster is partitioned into multiple sub-clusters, a fencing decision for the multiple sub-clusters of the first computing cluster.

* * * * *